United States Patent [19]

Otto

[11] Patent Number: 4,946,347
[45] Date of Patent: Aug. 7, 1990

[54] TURBINE BLADE FOR HYDROELECTRIC GENERATORS

[75] Inventor: Karl Otto, Rodenberg, Fed. Rep. of Germany

[73] Assignee: Kunststofftechnik Rodenberg GmbH & Co. KG, Rodenberg, Fed. Rep. of Germany

[21] Appl. No.: 282,627

[22] Filed: Dec. 9, 1988

[30] Foreign Application Priority Data

Dec. 11, 1987 [DE] Fed. Rep. of Germany ....... 3742046

[51] Int. Cl.⁵ .............................................. F01D 5/14
[52] U.S. Cl. ...................................................... 415/200
[58] Field of Search ........... 416/241 R, 241 A, 229 R, 416/229 A, 213 R; 415/200, 217.1

[56] References Cited

U.S. PATENT DOCUMENTS

| | | | |
|---|---|---|---|
| 1,472,924 | 11/1923 | Lyndon | 251/192 |
| 1,706,372 | 3/1929 | Anderson | 415/150 |
| 1,869,655 | 8/1932 | Beebe | 416/229 R |
| 2,120,277 | 6/1938 | Grierson | 416/229 |
| 3,301,927 | 1/1967 | Exley et al. | 416/241 A |
| 3,400,904 | 9/1968 | Bede | 416/241 A |
| 4,464,097 | 8/1984 | Schultz | 416/230 |

FOREIGN PATENT DOCUMENTS

| | | |
|---|---|---|
| 1224219 | 9/1966 | Fed. Rep. of Germany . |
| 7020605 | 6/1970 | Fed. Rep. of Germany . |
| 1192949 | 10/1059 | France . |
| 1355427 | 2/1964 | France ........................ 416/241 A |
| 324300 | 10/1957 | Switzerland . |
| 331945 | 9/1958 | Switzerland . |

Primary Examiner—Edward K. Look
Assistant Examiner—John T. Kwon
Attorney, Agent, or Firm—Jeffers, Hoffman & Niewyk

[57] ABSTRACT

To reduce the manufacturing expense of turbine blades and specifically, to extensively avoid their stock removal type processing, a blade is constructed of a metallic core and an outer skin which covers at least approximately the entire wetted surface of the turbine blade and is made by molding, from a nonmetallic material such as polyurethane, caoutchouc or similar elastomeric plastic.

1 Claim, 4 Drawing Sheets

TURBINE BLADE FOR HYDROELECTRIC GENERATORS

BACKGROUND OF THE INVENTION

The field of the invention is that of rotatable turbine blades for hydroelectric generators.

Depending on their load, turbine blades are usually cast from steel or cast iron. Producing its finished shape requires a considerable expense for stock removal work. The mass forces caused by the great weight of these turbine blades must be allowed for in the design of the turbine blade adjustment apparatus. Also, a correspondingly high sealing pressure is applied in a guide apparatus formed by such blades. This achieves, with a sealed guide apparatus, a watertight closure in the area of the sealing edges of all turbine blades, despite manufacturing and assembly defects. Weight advantages are realized, though, when making the turbine blades from plate, according to another manufacturing process. Connected by welding, these plates have a better surface finish than castings, but such turbine blades also require a stock removal type processing in the area of the sealing edge.

U.S. Pat. No. 1,472,924 describes molding into the blade of a turbine made from steel or cast steel a groove that extends parallel with the turbine axis of rotation into which slot a strip from babbitt metal or wood is inserted. This achieves an improved sealing effect between the turbine blade contained in sealing position, in that the sealing edge of the adjacent turbine blade strikes against the inserted strip, and through its plastic deformation.

Also, West German Pat. No. 1,224,219 describes a turbine blade made in customary fashion where separate, attached seals are fastened to the fronts of the blade. These seals consist of a metallic core which is screwed to the turbine blade, and is provided with an inflatable envelope made of caoutchouc. In the closing position of the turbine blade, the seal is inflated. This makes contact with the components of the hydroelectric generator which border on the turbine blade, providing in this area a seal against the penetration of leakage water.

What is needed is a turbine blade which can be inexpensively produced. Specifically a turbine blade, which avoids stock removal type processing, is needed.

SUMMARY OF THE INVENTION

One object of the present invention is to reduce the manufacturing expense of turbine blades, specifically to extensively avoid their stock removal type processing. The present invention achieves economic efficiency because the blade has a metallic core and an outer skin from a nonmetallic material, such as polyurethane, caoutchouc or similar elastomeric plastic. The outer skin approximately covers the entire wetted surface of the blade and is made by molding.

While the manufacturing of the present invention's turbine blade requires making a mold, this is economical in view of the number of identically shaped blades that are needed for each hydroelectric generator. In the turbine blade, the metallic core assumes the transfer of the adjustment forces exerted by the guide apparatus of the generator; further, it dissipates the hydraulic forces to generator components serving the mounting of the turbine. Produced with the outer skin, in contrast, the present invention has a highly accurate shaping of the turbine blade. The materials used for that purpose are distinguished by elasticity, so that the sealing pressure of the turbine blades, in the closed position of the guide apparatus, may have a smaller magnitude in obtaining a sealed contact of the sealing edges of adjacent turbine blades. Additionally, the materials used for the outer skin are distinguished by high form stability, specifically against erosion by sand in the water.

The present invention comprises a turbine blade for hydroelectric generation. The turbine blades are for use with a rotatably mounted guide apparatus of a hydroelectric generator, so that when closed the turbine blades bear on an adjacent turbine blade. The turbine blade has a metallic core and an outer skin. The outer skin is made of a non-metallic elastic material and covers at least the turbine blade's entire wetted surface. The outer skin is mounted on the core and can be made of polyurethane, caoutchouc, or similar elastomeric plastic. The present invention provides manufacturing advantages, since the turbine blade requires no stock removal type processing prior to the application of the outer skin. Additionally, merely a cleaning of the blade is required, for instance by sandblasting, which improves the adhesion of the outer skin to the core.

The structure of a blade core is distinguished through the use of components which have a simple design. The core has a cylindrical part with welded plates which are connected with each other through the material and give the blade a high form stability. The cylindrical part extending along the axis of rotation of the blade can be designed as a blade stem that extends beyond the blade and to which the adjustment apparatus of the hydroelectric generator may be attached. Or, the cylindrical component is fashioned as a pipe through which passes in the installed condition of the blade a bolt that serves the mounting and is fastened in adjacent components of the hydroelectric generator.

An additional embodiment has a second hollow cylindrical component welded to the core in the area of the approach edge. This part can be engaged by a connecting rod and a pin, which is connected with the turbine blade adjustment apparatus. This component improves the highly stressed approach edge of the turbine blade in its form stability. The blade core has a high form stability and an intimate connection with the outer skin, since the outer skin material wraps around the plate on all sides. An outer skin connected by a form-fit achieves an increased resistance to detachment of the outer skin from the core.

Lastly, it may also be advantageous to connect the core with the outer skin by material connection. This connection can be achieved by application of a suitable binder on the core prior to the molding operation or, in the case of using caoutchouc as outer skin material, by its vulcanizing bonding.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings wherein.

The exemplifications set out herein illustrate a preferred embodiment of the invention, in one form thereof, and such exemplifications are not to be construed as limiting the scope of the disclosure or the scope of the invention in any manner.

DETAILED DESCRIPTION OF THE PREFERRED EMBODIMENT

Figure 1:
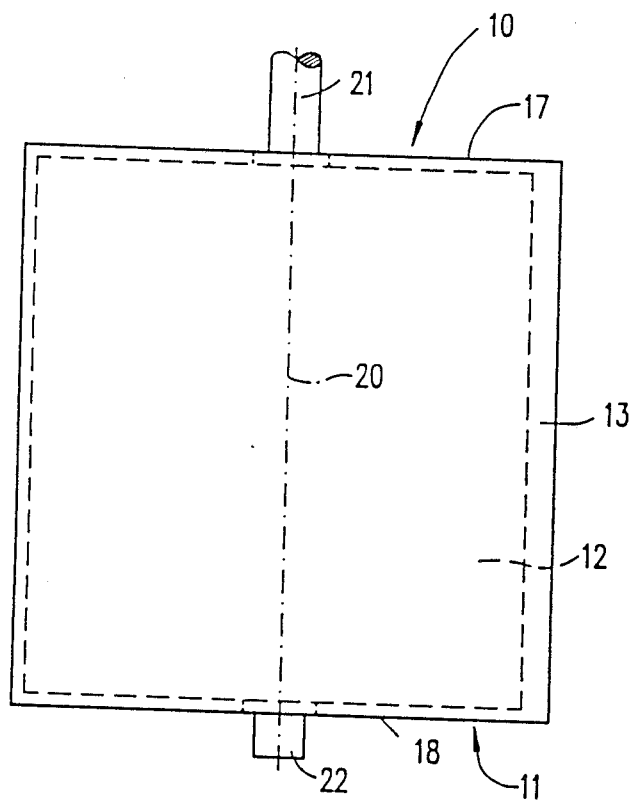
FIG. 1 shows a lateral view of a turbine blade where the blade consists of a core with an all-around outer skin, as a first embodiment.
Figure 2:
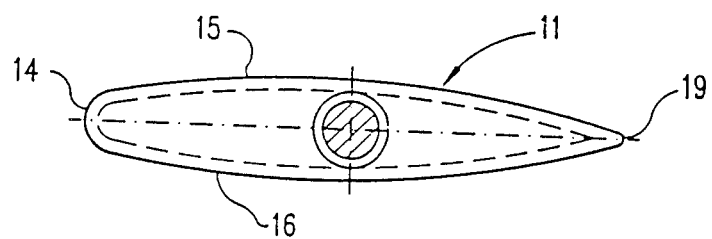
FIG. 2 is a plan view on the end of the turbine blade according to FIG. 1.

The turbine blade 10, illustrated in FIGS. 1 and 2 as a first embodiment, comprises a blade 11 which consists of a core 12 and an outer skin 13. The core 12 is fashioned as an integral casting from cast iron or cast steel. The outer skin 13 consists of a nonmetallic material such as polyurethane, caoutchouc or other elastomeric plastic.

The outer skin 13 is made by molding, i.e., it is produced in a mold (not shown) which features the finished shape of the blade 11 as a cavity. Suitable methods for producing the outer skin 13 include casting, pressing, injection molding and injection pressing. In the process, the core 12 is placed in the mold and surrounded on all sides with the mentioned material in an exactly dimensioned layer thickness. The outer skin 13 thus extends from an approach edge 14 of the blade 11 along its two broadsides 15, 16 and the ends 17, 18 to a departure edge 19. Extending through the outer skin 13 on its end 17, merely in the area of the axis of rotation 20 of the turbine blade 10, is a blade stem 21 and on its end 18 a blade gudgeon 22. Extending coaxially with the axis of rotation 20, the blade stem and the blade gudgeon 22 serve the mounting of the turbine blade in the housing components (not shown) of the hydroelectric generator which border on the two ends 17 and 18.

The bonding of the outer skin 13 to the core 12 can be obtained by material connection through the use of binders, such as adhesives or similar, or through the use of caoutchouc by vulcanization bonding or by form-fit connection such as described for the following embodiments.

Figure 3:
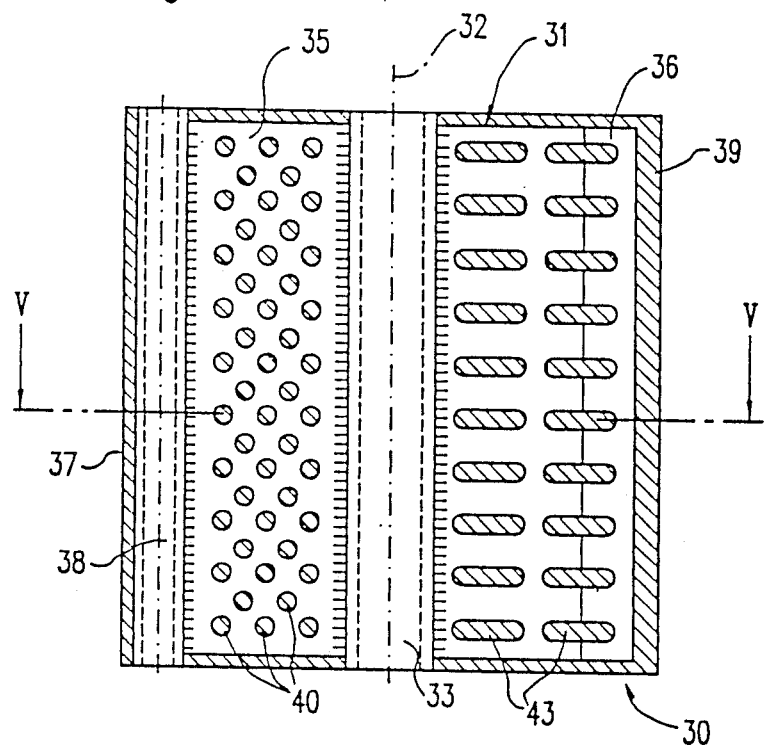
FIG. 3 is a turbine blade, in cross section, with a core consisting of cylindrical parts and welded plates, as a second embodiment.
Figure 4:
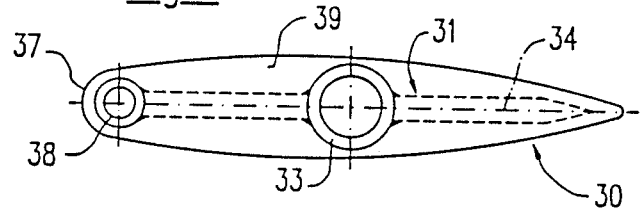
FIG. 4 is a plan view of the blade according to FIG. 3.
Figure 5:
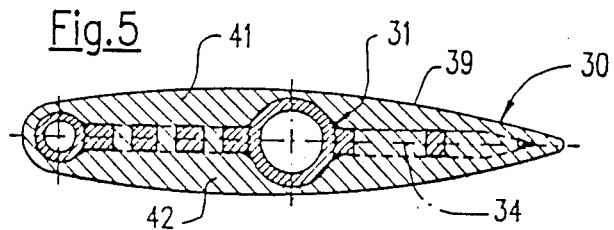
FIG. 5 is a cross section of a blade along lines V—V in FIG. 3.

In the second embodiment according to FIGS. 3–5, the turbine blade 30 has a core 31 which is composed of several individual components. The core 31 has as a central cylindrical part a tube 33 which extends equiaxially with its axis of rotation 32 and to which plates 35 and 36 are welded on both sides which extend in the center plane 34 of the turbine blade 30. Another cylindrical component 38 is welded to the plate 35 extending toward the area of the approach edge 37 of the turbine blade 30. This component 38 is fashioned as a tube which extends parallel with the axis of rotation 32 of the turbine blade 30. The tube 33 of the blade core 31 serves to receive a bolt (not shown) which is mounted in the bordering housing components (not shown) of the hydroelectric generator and serves to provide an axis of rotation for the turbine blade 30. The component 38 of the core 31, mounted on the approach edge 37 of the turbine blade 30, serves the attachment of turbine blade adjustment apparatus (not shown), whose connecting rod engages the component 38 with a pin.

The shape of the turbine blade 30 is defined by the outer skin 39 of nonmetallic materials which wraps around the entire wetted surface and is produced by molding. Only the end faces and the cavity of the cylindrical components 33 and 38 of the core 31 are not covered by the skin 39.

For connecting the outer skin 39 with the core 31, one embodiment makes use of measures producing a form-fit between core and outer skin. To that end, the plate 35 of the blade core 31 is provided with a number of through-bores 40. The material of the outer face 39 extends through these bores 40 so that the two outer skin sections 41 and 42, which are located on both sides of the center plane 34 of the blade, are connected with each other. These bores 40 can also be provided on the plate 36. Instead of the bores 40, it is also possible, such as on the plate 36 shown in FIG. 3, to provide openings (one example being in the form of slots), through which extends the material of the outer skin 39 and which produces the form-fit between the core 31 and the outer skin.

Figure 6:
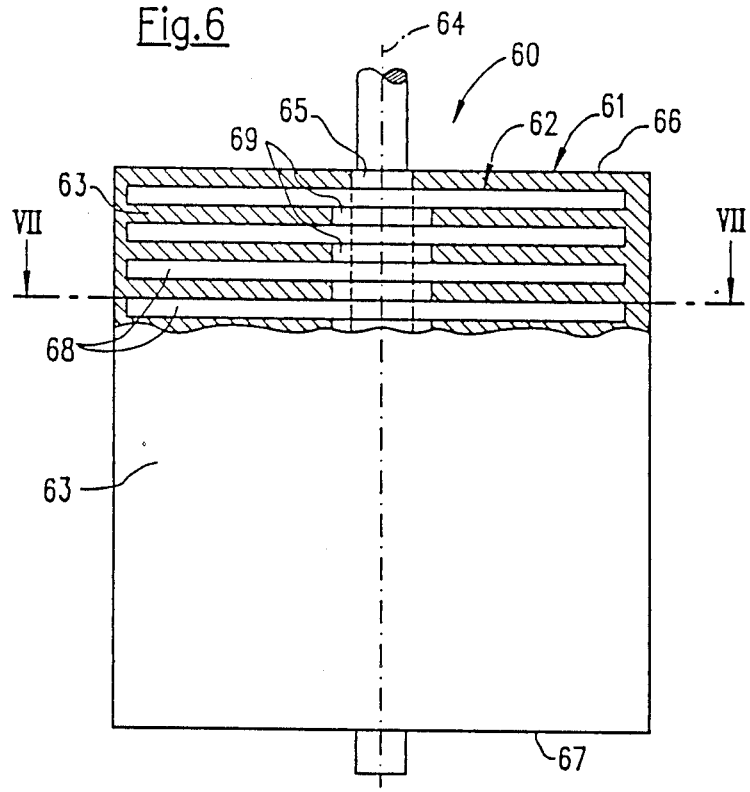
FIG. 6 is a lateral view, partly broken away, of a blade with a core featuring lamination plates, as a third embodiment.
Figure 7:
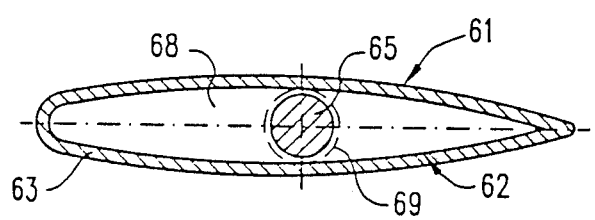
FIG. 7 is a cross section of this blade along line VII—VII in FIG. 6.

An additional embodiment of a turbine blade 60 is depicted in FIGS. 6 and 7. This embodiment features a blade 61 composed of a core 62 with an outer skin 63 produced as described above. The core 62 has a cylindrical part 65 which extends equiaxially with the axis of rotation 64 of the blade 60. Threaded on this part 65, between the ends 66 and 67 of the blade 61, are equally shaped plates 68 at a mutual spacing. These plates 68 have a shape which geometrically is similar to the blade profile, as can be seen from FIG. 7. For axial fixing of the blades 68, a spacer busing 69 is slipped on each cylindrical part 65 between each two plates. The plates 68 and the spacer bushings 69 are welded to the cylindrical part 65. The material of the outer skin 63 envelopes the plates 68 on all sides, i.e., it occupies also the spaces between adjacent plates.

Figure 8:
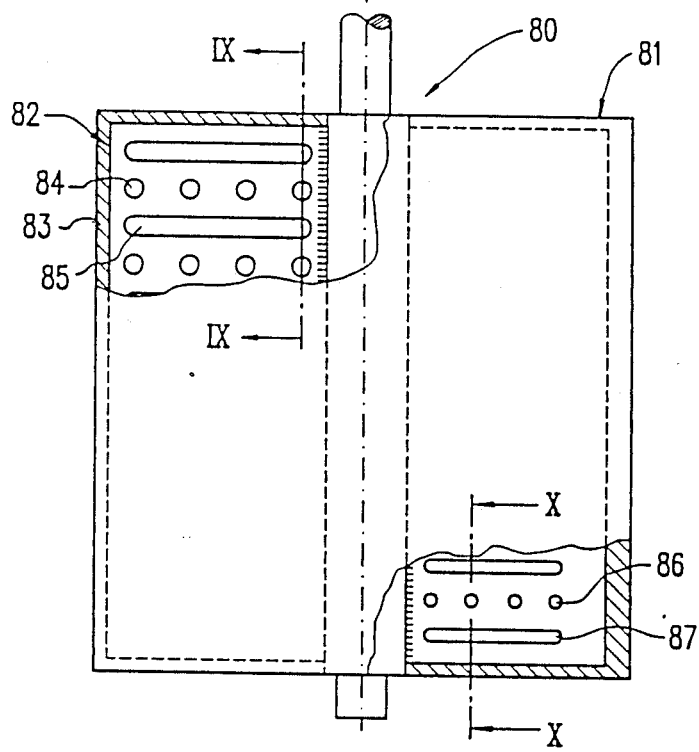
FIG. 8 is a lateral view of a blade, with the outer skin partly removed, as a fourth embodiment.
Figure 9:
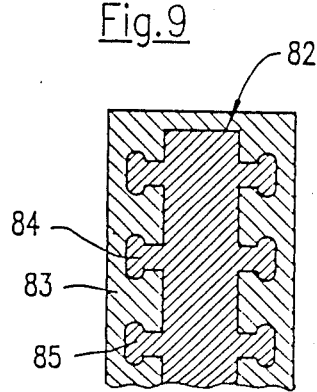
FIG. 9 is a section of a blade area along line IX—IX in FIG. 8, with a form-fit connection between core and outer skin.
Figure 10:
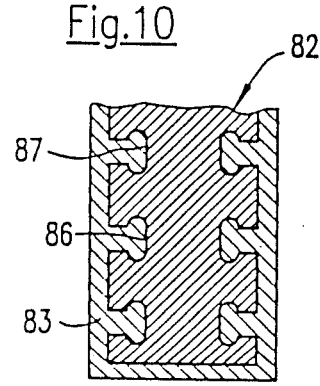
FIG. 10 is a section of a blade area along line IX—IX in FIG. 8 with another embodiment of a form-fit connection between blade core and outer skin.

A further embodiment of a turbine blade 80 is shown in FIGS. 8–10. Here, the turbine blade 80 also comprises a blade 81 with a core 82 and an outer skin 83 produced by molding. For obtaining a form-fit between the core 82 and the outer skin 83, relieved button-shaped projections 84 and strip-shaped projections 85 are molded on both sides of the core. FIG. 9 shows the projections being enveloped by the outer skin 83. The form-fit can be established either by solely using the button type projections 84 or solely using the strip-shaped projections 85, either of which are arranged along the entire surface of the core. Also, form-fit can be obtained by providing the core 82 with recesses 86 or grooves 87 that are widened at the bottom and are engaged by the outer skin as shown in FIG. 10.

While this invention has been described as having a preferred embodiment, it will be understood that it is capable of further modification. This application is therefore intended to cover any variations, uses, or adaptations of the invention following the general principles thereof and including such departures from the present disclosure as come within known or customary practice in the art to which this invention pertains and fall within the limits of the appended claims.

What is claimed is:

1. A turbine blade for rotatably mounted guide apparatuses of hydroelectric generators wherein a hydroelectric generator includes a plurality of said blades which are rotatably mounted and are adapted to rotate about an axis of rotation between two positions, one of the positions being a closed position having each said blade abutting adjacent ones of said blades, said turbine blade comprising:

a body including two spaced apart ends, an approach edge and a departure edge extending between said ends and generally parallel to said axis of rotation, said body having a wetted surface extending from said approach edge to said departure edge;

a unitary cast metallic core extending within said body, said core including a cylindrical portion which is coaxial with said axis of rotation, said cylindrical portion being welded to a plurality of generally identical plates, said plates spaced equidistantly across said cylindrical portion between said ends, each of said plates having a cross-section generally identical in contour to but smaller in dimension than said turbine blade, each said plate extending from said approach edge to said departure edge, said cylindrical portion being coplanar with a central plane extending through said approach edge and said departure edge; and a molded outer skin form-fit on said core and substantially defining said wetted surface, said outer skin adapted to form a water-tight seal with adjacent blades in the closed position, said outer skin formed of a non-metallic elastic material selected form the group consisting of polyurethane caoutchouc, and similar elastomeric plastics.

* * * * *